United States Patent

Walton

[15] 3,664,118

[45] *May 23, 1972

[54] ELECTRONICALLY CONTROLLED TIMEPIECE USING LOW POWER MOS TRANSISTOR CIRCUITRY

[72] Inventor: Richard S. Walton, Lancaster, Pa.

[73] Assignee: Hamilton Watch Company, Lancaster, Pa.

[ * ] Notice: The portion of the term of this patent subsequent to Feb. 2, 1988, has been disclaimed.

[22] Filed: Sept. 9, 1970

[21] Appl. No.: 70,787

Related U.S. Application Data

[63] Continuation-in-part of Ser. No. 768,076, Oct. 16, 1968, Pat. No. 3,560,998.

[52] U.S. Cl. ................................58/50 R, 58/23 A, 331/113

[51] Int. Cl. ......................................B04c 3/00, G04b 19/30

[58] Field of Search ................58/50 R, 23, 28, 28 A, 28 AO; 331/108, 113

[56] References Cited

UNITED STATES PATENTS

| | | | |
|---|---|---|---|
| 3,560,998 | 2/1971 | Walton | 58/23 |
| 3,530,662 | 9/1970 | Schoninger | 58/28 X |
| 3,469,210 | 9/1969 | Freeman | 331/113 |

*Primary Examiner*—Richard B. Wilkinson
*Assistant Examiner*—Edith C. Simmons
*Attorney*—Le Blanc & Shur

[57] ABSTRACT

Disclosed is an electronically controlled timepiece suitable for use as a wristwatch. A novel solid state electronic oscillator operating at a frequency substantially in excess of the desired timekeeping rate is connected to a divider in the form of a chain of integrated circuit transistor stages formed of complementary MOS devices. The divider may be formed from static counters or a combination of dynamic and static counters. Connected to the output of the divider is a display actuator and timekeeping display.

25 Claims, 10 Drawing Figures

INVENTOR
RICHARD S. WALTON

BY Le Blanc & Shur

ATTORNEYS

ELECTRONICALLY CONTROLLED TIMEPIECE USING LOW POWER MOS TRANSISTOR CIRCUITRY

This application is a continuation-in-part of copending application Ser. No. 768,076, filed Oct. 16, 1968, now Pat. No. 3,560,998.

This application is a continuation-in-part of copending application Ser. No. 768,076, filed Oct. 16, 1968, now U.S. Pat. No. 3,560,998.

The present invention relates to electronic timekeeping devices and more particularly to an electronically regulated timekeeping device employing a master frequency standard of relatively high frequency and an electronic frequency converter to provide lower frequency drive signals at the desired timekeeping rate through suitable actuating means to a timekeeping display. The concepts disclosed herein are particularly adapted for use in electronic wristwatches or the like where compact construction and low power dissipation are essential.

Battery powered wristwatches and other small portable timekeeping devices of various types are well known and are commercially available. One such device which has proven to be quite successful commercially is shown and described in assignee's U.S. Pat. No. Re. 26,187, reissued Apr. 4, 1967, to John A. Van Horn et al, for ELECTRIC WATCH. Electric watches of this type employ a balance wheel and a hairspring driven by the interaction of a current-carrying coil and a magnetic field produced by small permanent magnets. Other types of mechanically regulated battery operated wristwatches are also known.

Considerable effort has also been directed toward the development of high accuracy wristwatches which do not employ electromechanical oscillators as the master speed reference. One approach which has been considered and has been subjected to substantial investigation is the use of completely electronic circuitry to generate a master drive signal for the time display. For example, it has been proposed to provide a low frequency oscillator or pulse generator operating at the desired timekeeping rate for direct drive of the time display through an electromechanical energy converter. However, difficulties have been encountered in implementing this, including the difficulty of providing a suitable stable low frequency oscillator of realistic size and power consumption for use in a wristwatch.

Alternatively, there has been considered the use of a high frequency oscillator as a frequency standard in conjunction with frequency conversion circuitry to provide a drive signal at the timekeeping rate. Unfortunately, there has not heretofore been available an oscillator-frequency converter combination having not only the required frequency stability, but also sufficiently low power dissipation and small size to be practical for use in a battery powered wristwatch.

The present invention overcomes the aforementioned difficulties in providing a battery operated wristwatch employing a purely electronic frequency standard. The construction employed includes a relatively high frequency oscillator and a low power integrated circuit frequency divider coupled with a time display and suitable time display actuator. The circuitry includes an ultra low power integrated circuit, free-running multivibrator, and frequency divider constructed of a series of stages of integrated transistor circuitry so arranged that current flow through the circuit takes place only during circuit state transitions and not during the stable periods between transitions. The required circuitry can be constructed of relatively inexpensive components, thereby making the new electronically controlled wristwatch commercially competitive with conventional spring-driven and electric watches.

The circuit is characterized, as previously mentioned, by small size and ultra low power consumption. The primary frequency source is of a sufficiently high frequency to avoid the problems heretofore encountered with low frequency, direct drive of the timekeeping display, yet not so high as to require an excessive number of frequency divider stages. Utilization of even a large number of divider stages without excessive power consumption is achieved by a circuit arrangement in which circuit state transitions in response to operation of the primary frequency source are responsive to signal voltage transitions rather than current or power level changes.

The foregoing is achieved in the present invention by provision of a frequency divider constructed of a series of stages of transistor integrated circuitry, including transistors of opposite conductivity types, arranged in a complementary configuration, with a transistor of one conductivity type serving as a load circuit for a transistor of another conductivity type. Preferably, the free-running multivibration primary frequency source is also constructed in this manner.

Also disclosed is a novel binary frequency divider which combines the features of both a static and dynamic counter. The dynamic counter forms the high frequency divider stages which utilize the capacitance of the transistors to accomplish the divide by 2 function. This makes possible a divider using a much smaller number of transistors and further reduces the power consumption by minimizing the input capacitance of the divider stages. Also disclosed is a simplified and inexpensive quartz crystal oscillator usable as the primary frequency source. The active element of the oscillator is a complementary MOS inverter with a protective diode between the gate and source of the P-channel transistor. Passive oscillator components include a bias resistor, a quartz crystal and a variable tuning capacitor.

A further embodiment of the present invention is comprised of a plurality of metal oxide semiconductor (MOS) transistor integrated circuit stages arrayed in a complementary P- and N-channel configuration both for the primary frequency source and the divider. A suitable number of divider stages is employed to convert the primary frequency to a 1 Hz drive signal for the time display.

Accordingly, it is an object of this invention to provide an improved electronically regulated timekeeping device.

It is another object of this invention to provide an improved electronically regulated timekeeping device characterized by high accuracy, small size and low power dissipation.

It is a further object of this invention to provide an electronically regulated timepiece as described above constructed of relatively inexpensive components, yet retaining the required accuracy and compactness to produce a commercially satisfactory product.

It is also an object of this invention to provide an electronically regulated timepiece including an electronic primary frequency source of relatively high frequency and a frequency divider, the circuitry of the frequency source and the frequency divider being so arranged that current flow through the circuit takes place only during circuit state transitions and not during the stable periods between transitions.

It is a further object of this invention to provide such an electronically regulated timepiece in which the circuit state transitions in the frequency divider circuit stages are initiated in response to a change in voltage level rather than power or current level.

Another object of the present invention is to provide an improved electronic oscillator.

Another object of the present invention is to provide a simplified integrated circuit oscillator comprised of a complementary MOS inverter controlled by a crystal or other frequency regulation device.

It is another object of this invention to provide an electronically regulated timekeeping device comprised of a series of stages of transistor integrated circuitry including transistors of opposite conductivity types arranged in complementary configuration with a transistor of one conductivity type serving as a load circuit for a transistor of another conductivity type.

It is an additional object of this invention to provide an electronically regulated timekeeping device including an integrated circuit high frequency oscillator and frequency divider formed of a plurality of metal oxide semiconductor transistor stages to produce timekeeping pulses, a time display, and actuating means responsive to the timekeeping pulses for operating the time display.

It is also an object of this invention to provide an electronically regulated timekeeping device employing an oscillator-frequency converter combination including a plurality of integrated circuit metal oxide semiconductor transistor stages, each stage being constructed of an array of metal oxide semiconductor transistors in complementary N- and P-channel configuration.

It is an additional object of this invention to provide an electronic timekeeping device employing an electronic frequency divider characterized by extremely low power dissipation.

Another object of the present invention is to provide an electronic timekeeping device employing an electronic frequency divider which combines dynamic and static counter stages for extremely low power dissipation.

It is yet a further object of this invention to provide an electronic timekeeping device having an integrated circuit frequency divider as described above including a plurality of metal oxide semiconductor transistor stages, each stage including an plurality of transistors arranged so that the load circuit for a given transistor includes another transistor of opposite conductivity type.

Further objects and advantages of the present invention will be more apparent upon reference to the following specification, claims, and appended drawings, wherein:

Figure 1:
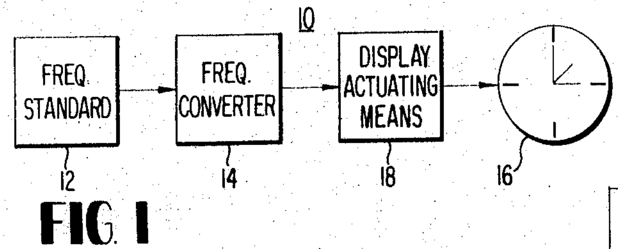
FIG. 1 is an overall block diagram of the electronically controlled timekeeping device in accordance with this invention.

Referring now to FIG. 1, there is shown a block diagram of an electronically regulated timekeeping device in accordance with this invention. The device, generally indicated at 10, includes a frequency standard 12, frequency converter 14, a time display 16, and a display actuating means 18 coupling time display 16 to frequency converter 14. Frequency standard 12 and frequency converter 14 are constructed of a plurality of stages of transistor integrated circuitry to achieve compactness and a low order of power consumption. To achieve ultra low power consumption, however, it has been found necessary to construct the circuitry in such a manner that current flows only during circuit state transitions and not during the stable periods between transitions.

This is best accomplished by employment of a circuit stage configuration including transistors of complementary conductivity types, with a transistor of one conductivity type serving in the load circuit for a transistor of opposite conductivity type. The circuits should employ transistors which switch in response to changes in voltage level rather than current or power levels, and are preferably formed of metal oxide semiconductor (MOS) transistor integrated circuits such as described more fully hereinafter.

Time display 16 may take several suitable forms, such as the conventional watch face and cooperating second, minute, and hour hands shown. In that case, display actuating means 18 is preferably a suitable miniaturized electromechanical energy converter responsive to the periodic drive signal provided by frequency converter 14.

Frequency standard 12 provides a primary or master signal at a frequency substantially in excess of that employed in the actual operation of time display 16 and actuating means 18. Accordingly, frequency converter 14 is provided to reduce the frequency of the master signal. This produces the drive signal which operates the display actuating means 18. In a practical embodiment, a standard frequency of at least about 5 kHz and a drive signal rate of 1 Hz for direct drive of the second hand are preferred, together with a conventional gear train mechanism to operate the minute and hour hands.

Figure 2:
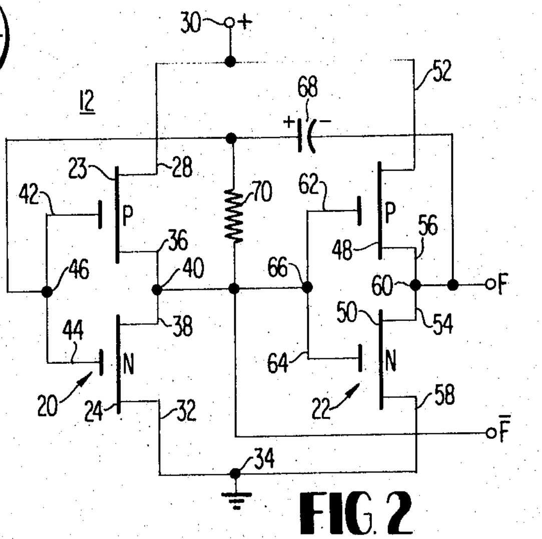
FIG. 2 is a circuit diagram of a suitable embodiment of the frequency standard shown in FIG. 1.

The construction of a suitable frequency standard oscillator 12 is illustrated in FIG. 2. The circuit embodies the concepts specified above, viz., complementary construction with transistors of opposite conductivity type serving mutually in load circuits for each other, and current flow only during circuit state transitions and not during the steady state periods between transitions.

In the preferred embodiment having elements responsive to changes in voltage rather than current or power levels, the circuit comprises two pairs of metal oxide semiconductor (MOS) transistors denoted 20 and 22. Transistor pair 20 includes a P-channel transistor 23 and an N-channel transistor 24. A source terminal 28 of P-channel transistor 23 is coupled to a positive power supply at 30 while source terminal 32 of N-channel transistor 24 is connected to ground 34. Drain terminals 36 and 38 of P-channel transistor 23 and N-channel transistor 24, respectively, are coupled together at 40. Also, gate terminals 42 and 44 of P-channel transistor 23 and N-channel transistor 24, respectively, are coupled together at 46.

Transistor pair 22 is similarly constructed and includes a P-channel transistor 48 and an N-channel transistor 50. A source terminal 52 of P-channel transistor 48 is coupled to positive power supply at 30 while a source terminal 58 of N-channel transistor 50 is connected to ground 34. Drain terminals 54 and 56 of P-channel transistor 48 and N-channel transistor 50, respectively, are coupled together at 60. Also, gate terminals 62 and 64 of P-channel transistor 48 and N-channel transistor 50, respectively, are coupled together at 66.

As is known, MOS transistors are ordinarily provided with substrate terminals. While these have been omitted here, in the interest of clarity, it should be understood that for P-channel transistors 23 and 48, substrate connections are made to the positive power supply at 30 while for N-channel transistors 24 and 50, substrate connections are made to ground.

Common drain terminal 40 of transistor pair 20 is directly coupled to common gate terminal 66 of transistor pair 22. Also, common drain terminal 60 of transistor pair 22 is coupled through a feedback capacitor 68 to common gate terminal 46 of transistor pair 20. A further feedback path is provided by a resistor which is connected from the common junction points 40 and 66 to common gate terminal 46.

As may be appreciated, free-running multivibrator operation is achieved by the feedback paths and direct coupling described, with the frequency of oscillation being determined by the values selected for capacitor 68 and resistor 70.

Two frequency standard outputs, hereinafter denoted as F and $\overline{F}$, are provided. Output F is taken from common drain terminal 60 of transistor pair 22, while output $\overline{F}$ is taken at common drain terminal 40 of transistor pair 20.

In operation, frequency standard oscillator 12 provides squarewave outputs F and $\overline{F}$ at a frequency determined by capacitor 68 and resistor 70. The output F is at approximately the power supply voltage when output $\overline{F}$ is at ground. Conversely, the output $\overline{F}$ is at approximately the power supply voltage when output F is at ground.

The operation may best be understood by first considering transistor pairs 20 and 22 separately. For transistor pair 20, if the voltage at common gate terminal 46 is sufficiently above a certain minimum threshold voltage, P-channel transistor 23 will be in its nonconductive (OFF) state and N-channel transistor 24 will be in its highly conducting (ON) state. Under those conditions, common drain terminal 40 will essentially be shorted to ground through ON transistor 24 and the signal output F will be a low voltage. This will be referred to hereinafter as the ZERO state. On the other hand, if the voltage appearing at common gate terminal 46 is sufficiently below the threshold, the conductive states are reversed with N-channel transistor 24 being OFF and P-channel transistor 23 being ON. Under these conditions, common drain terminal 40 is shorted to the power supply terminal 30 through ON transistor 23 and the output $\overline{F}$ is at a high voltage. This will be denoted as the ONE state. Operation of transistor pair 22 is identical to that of transistor pair 20.

As previously explained, transistor pairs 20 and 22 are interconnected. Thus, the input at common gate terminal 66 is the same as the output at common drain terminal 40. If the output $\overline{F}$ is ONE, the input to common gate terminal 66 is high and N-channel transistor 50 is ON. Common drain 60 is then shorted to ground and output F is ZERO. Conversely, if the voltage at common drain terminal 40 is low, P-channel transistor 48 is ON and output F will be ONE.

To understand the mechanism of transition between ONE and ZERO states, assume that the common drain terminal 40 is at a high voltage, i.e., $\overline{F}$ is ONE. Common drain terminal 60 is then at a low voltage, i.e., F is ZERO. Under these conditions, a charging path for capacitor 68 exists from power supply terminal 32 through transistor 23, resistor 70, capacitor 68, and transistor 50 to ground whereby a positive voltage across the capacitor in the direction shown is established.

Since the positive side of capacitor 60 is coupled to common gate terminal 46 of transistor pair 20, the voltage there rises with the voltage across the capacitor, ultimately reaching a level exceeding the threshold voltage for N-channel transistor 24. This causes an inversion of the conductivity states of transistors 23 and 24, and output $\overline{F}$ switches from ONE to ZERO. Since common drain terminal 40 (output $\overline{F}$) is directly coupled to common gate terminal 66 in transistor pair 20, the voltage there falls below the threshold voltage of N-channel transistor 50. This causes an inversion of conductivity states of transistors 48 and 50, and output F switches from ZERO to ONE.

Since the voltage across capacitor 68 cannot change instantaneously, the rapid voltage rise of output F is transmitted back to common gate terminal 46 of transistor pair 20. The latter, previously at or slightly above the threshold voltage, is now driven to a large positive value. This insures that the common drain output 40 ($\overline{F}$) will remain at ZERO.

With conductivity states of the circuit reversed, capacitor 68 discharges to ground through resistor 70 and N-channel transistor 24. After capacitor 68 has been discharged, it begins to charge again but in the sense opposite to that indicated in FIG. 2, through P-channel transistor 48, capacitor 68, resistor 70, and N-channel transistor 24 to ground.

The charging process continues until the voltage at common gate terminal 46 falls to the threshold voltage for N-channel transistor 24, whereupon the conductivity states of transistors 23 and 24 again switch. Common drain terminal 40 of transistor pair 20 and common gate terminal 66 of transistor pair 22 both rise toward the power supply voltage as transistor 23 begins to conduct. This changes output $\overline{F}$ from ZERO to ONE. Also, this causes the conductivity states of transistors 48 and 50 to reverse, which changes output F from ZERO to ONE.

Since the voltage across capacitor 68 cannot change instantaneously, the output F at common drain terminal 60 is coupled directly to common gate terminal 46 maintaining transistor 23 OFF and transistor 24 ON. At this time, the same charging path for capacitor 68 as existed originally now exists again and the previously described process is continuously repeated. The resulting squarewave outputs F and $\overline{F}$ are shown in FIGS. 3*a* and 3*b*.

The above-described circuit possesses several distinct advantages for use in the electronic watch of this invention. However, it should be appreciated that other oscillator circuits, capable of providing highly stable operation, low power consumption, small size, etc., may be substituted.

Figure 4:
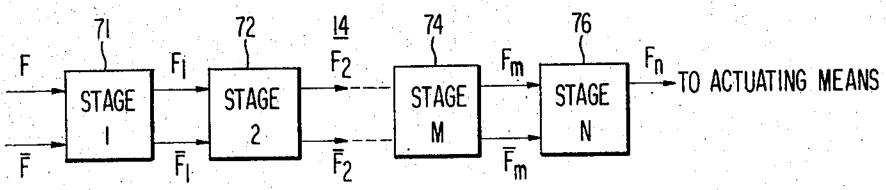
FIG. 4 is a block diagram showing the construction of the frequency converter shown in FIG. 1.

The required frequency conversion between the frequency standard signals and the low frequency drive signal may best be accomplished by utilization of a multistate binary frequency divider illustrated schematically in FIG. 4. Frequency converter 14 includes a plurality of series connected stages, four of which are shown. Each stage is provided with a pair of input terminals and a pair of output terminals. The inputs to first stage 71 are provided by the F and $\overline{F}$ outputs of frequency standard oscillator 12. Correspondingly, the input to second stage 72 is provided by the outputs of first stage 71, denoted $F_1$ and $\overline{F}_1$. This is continued for all remaining stages whereby the output of the $m^{th}$ stage 74 provides inputs $F_m$ and $\overline{F}_m$ to the $n^{th}$ stage 76. Stage 76 provides an output $F_n$ which constitutes the drive signal for display actuating means 18.

Each of the stages in frequency converter 14 serves to divide the input to that particular stage by 2. Thus, a succession of n stages provides division by $2^n$. If the frequency of output signal $F_n$ is to be 1 Hz, frequency f of the standard signal must be a power of 2 and the number of stages *n* must be chosen in accordance with the relationship: $n = \log_2 f$. For example, frequency standard oscillator 12 must operate at 4096 Hz with a frequency converter 14 having 12 stages ($n = 12$) to achieve a drive frequency of 1 Hz.

To achieve suitably low power dissipation levels to render such a multistage counter arrangement practical for use in a battery powered wristwatch, it has been found preferable to employ integrated circuits of a particular type as now described in detail. The particular circuitry which has been employed here is of the type described in connection with FIG. 2 above employing pairs of complementary voltage-level sensitive transistors so arranged that transistors of opposite conductivity type serve mutually in load circuits for each other. Again, the circuit configuration is preferably such that current flow occurs only during state transitions. To achieve compactness and low power consumption, integrated circuit construction should be employed here as in FIG. 2.

Figure 3:
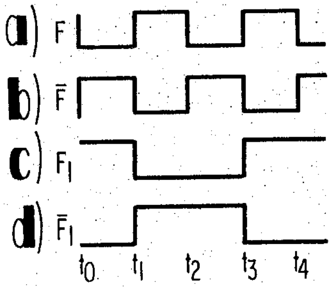
FIG. 3 is a waveform diagram pertinent to the operation of the circuits described herein.

The construction and operation of a suitable embodiment employing complementary MOS circuitry will now be described in connection with FIGS. 3 and 5.

Figure 5:
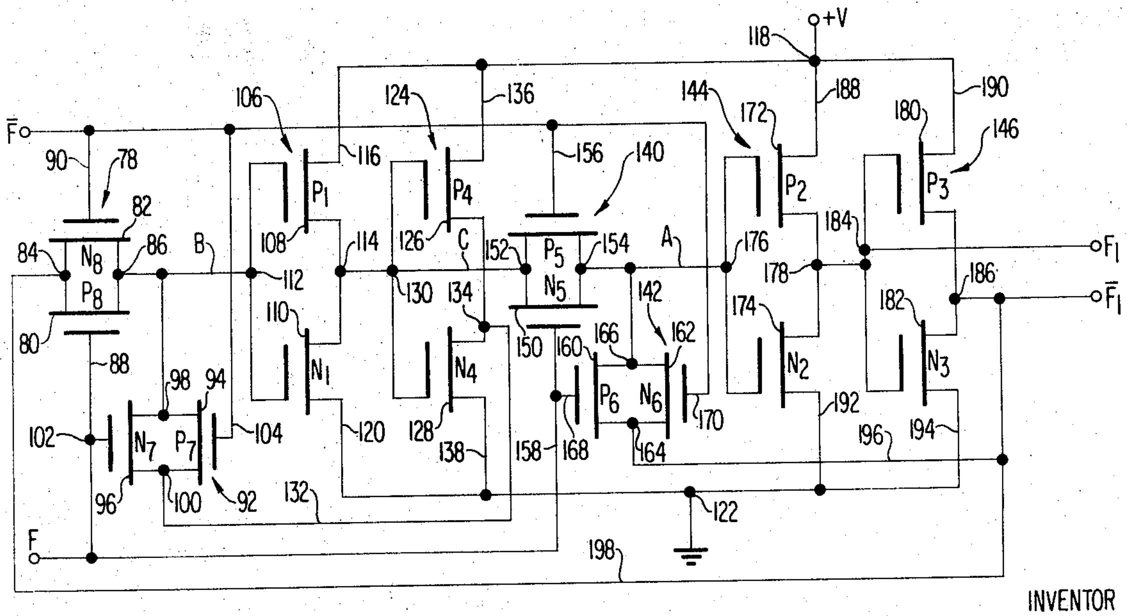
FIG. 5 is a block diagram of a practical embodiment of a frequency divider circuit suitable for use in the frequency converter of FIGS. 1 and 4.

As illustrated in FIG. 5, the circuit is constructed of a series of MOS transistor pairs, some of which serve signal transmission or gating functions and others of which serve frequency conversion or logic functions. These will be denoted as transmission pairs and logic pairs, respectively.

Specifically, the circuit comprises a first transmission pair 78 including a P-channel transistor 80 and an N-channel transistor 82 connected source-to-source at 84 and drain-to-drain at 86. Gate 86 of P-channel transistor 80 is connected to the F input while gate 90 of N-channel transistor 82 is connection to the $\overline{F}$ input. As will be understood, the F and $\overline{F}$ inputs constitute the high frequency inputs which are divided by a factor of 2 in each stage of frequency converter 14 shown in FIG. 4.

A second transmission pair 92 includes a P-channel transistor 94 and an N-channel transistor 96 coupled source-to-source at 98 and drain-to-drain at 100. Gate 102 of N-channel transistor 96 is connected to the F input while gate 104 of P-channel transistor 94 is connected to the $\overline{F}$ input. Common source terminal 98 of transmission pair 92 is connected to common drain terminal 86 of transmission pair 78.

A first logic pair 106 is formed of a P-channel transistor 108 and an N-channel transistor 110, connected at a common gate terminal 112 and at common drain terminal 114. Common gate terminal 112 is connected to output 86 of transmission pair 78. A source terminal 116 of P-channel transistor 108 is connected to the power supply at 118 while a source terminal 120 of N-channel transistor 110 is connected to ground at 122.

A second logic pair 124 is formed of a P-channel transistor 126 and an N-channel transistor 128 connected at a common gate terminal 130 to common drain terminal 114 of logic pair 106 and also by a feedback path 132 at common drain terminal 134 to input terminal 100 of transmission pair 92. A source terminal 136 of P-channel transistor 126 is connected to power supply 118 while a source terminal 138 of N-channel transistor 128 is connected to ground at 122.

The circuit of FIG. 5 also includes a second identical grouping of two transmission pairs 140 and 142 and logic pairs 144 and 146. Transmission pair 140 includes a P-channel transistor 148 and an N-channel transistor 150 connected source-to-source at 152 and drain-to-drain at 154. Gate terminal 156 of P-channel transistor 148 is connected to input $\overline{F}$ while gate terminal 158 of N-channel transistor 150 is connected to input F.

Transmission pair 142 includes a P-channel transistor 160 and an N-channel transistor 162 connected source-to-source at 164 and drain-to-drain at 166. Gate 168 of P-channel transistor 160 is connected to input F while gate 170 of N-channel transistor 162 is connected to input $\overline{F}$.

Logic pair 144 includes a P-channel transistor 172 and N-channel transistor 174 having a common gate connection 176 and a common drain connection 178. Logic pair 146 includes a P-channel transistor 180 and an N-channel transistor 182 having a common gate terminal 184 and a common drain terminal 186. Terminals 188 and 190 of P-channel transistors 172 and 180 are connected to power supply at 118 while source terminals 192 and 194 of N-channel transistors 174 and 182 are connected to ground at 122. A circuit output $F_1$ is provided at common drain terminal 178 of logic pair 144 while a second circuit output $\overline{F}_1$ is provided at common drain terminal 186 of logic pair 146.

Common drain terminal 186 also provides a feedback connection 196 to terminal 164 of transmission pair 142 and a second feedback connection 198 coupled to terminal 84 of transmission gate 78. As in the case of primary frequency source 12 described above, the substrate terminals for the various MOS transistors are not shown in the interest of clarity, but it should be understood that in all cases the substrates of P-channel transistors are coupled to the power supply and the substrates of N-channel transistors are coupled to ground.

To understand the operation of the above-described circuit, it should be recalled that for P-channel enhancement mode operation, a source to drain conductive path exists for low gate voltages. Increasing gate voltage reduces the conductivity, ultimately turning the transistor off when sufficient gate voltage is attained. Conversely, for N-channel enhancement operation, a conductive path does not exist for small gate voltages but rather is established when the gate voltage exceeds a minimum positive gating threshold.

By way of example, for transmission pair 78, a ONE input state of F and a ZERO input state of $\overline{F}$ (high and low voltages, respectively) will maintain both transistors 80 and 82 in a nonconductive (OFF) state. Conversely, in transmission pair 140, both transistors 148 and 150 will be in the conductive (ON) state.

As to logic pair 106, a positive voltage at common gate terminal 112 exceeding the gating threshold will turn N-channel transistor 110 ON and P-channel transistor 108 OFF. This establishes common drain output terminal 114 at ground potential through conducting transistor 110. Conversely, a low voltage at common gate terminal 112 will turn P-channel transistor 108 ON and turn N-channel transistor 110 OFF, which establishes common drain terminal 114 at essentially the power supply potential through conducting transistor 108.

Description of the actual operation of the circuit illustrated in FIG. 5 is most conveniently given in terms of the operating states of the transmission pairs and logic pairs rather than in terms of the voltages associated with the individual transistors themselves. Thus, a transmission pair will be referred to as ON when both the component transistors are conducting and OFF when both of the component transistors are nonconducting. Likewise, the output of a logic pair will be denoted as ONE when its common drain terminal voltage is high, i.e., when the input at the common gate terminal fails to exceed the gating threshold, thereby rendering the P-channel transistor conductive and the N-channel transistor nonconductive. Conversely, the output of a logic pair will be denoted as ZERO when the voltage at the common drain terminal is low, i.e., when the input at the common gate terminal exceeds the gating threshold, thereby rendering the P-channel transistor nonconductive and the N-channel transistor conductive.

With the foregoing in mind, and with reference to FIGS. 3*a*–3*d* and 5, assume that input states F and $\overline{F}$ switch to ZERO and ONE, respectively, at time $t_0$. Transmission pairs 78 and 142 go ON and transmission pairs 92 and 140 go OFF. Assume also that the output of logic pair 144 is high, thus making output state $F_1$ = ONE. (The alternative assumption of the output of logic pair 144 being low is also valid; this simply results in a one-half cycle shift in circuit operation as will be apparent from the description.) As a result, the input to logic pair 146 is ONE, and output state $\overline{F}_1$ is ZERO, as illustrated in FIGS. 3*c* and 3*d*.

Common gate terminal 112 of logic pair 106 is directly connected to ground at 122 through the N-channel transistor 182 in logic pair 146, feedback path 198, and ON transmission pair 78. Consequently, P-channel transistor 108 is ON, and logic pair 106 is in the ONE state. The resulting high voltage at common gate terminal 130 of logic pair 124 maintains the N-channel transistor 128 ON, and the common output 134 is low.

At time $t_1$, the input states F and $\overline{F}$ change to ONE and ZERO, respectively. Transmission pair 78 goes OFF and transmission pair 92 goes ON. The output of logic pair 106 is maintained in the ONE state since common gate terminal 112 is now coupled to ground through transmission pair 92, feedback path 132, and conducting N-channel transistor 128 in logic pair 124. (The latter is maintained conducting by the continued high output at common drain 114 of logic pair 106.)

The input transition at time $t_1$ also turns transmission pair 140 ON. This transfers the ONE state output of logic pair 106 to common gate terminal 176 of logic pair 144. Output 178 then switches to the ZERO state and circuit output state $F_1$ goes to ZERO as shown in FIG. 3*c*. This in turn switches logic pair 146 to the ONE state, and circuit output state $\overline{F}_1$ goes to ONE as illustrated in FIG. 3*d*.

At time $t_2$, the input states F and $\overline{F}$ again change to ZERO and ONE, respectively. This turns transmission pair 78 ON, and couples the ONE output of logic pair 146 to the input of logic pair 106 through feedback path 198. This establishes output 114 in the ZERO state which in turn establishes output 134 of logic pair 124 in the ONE state.

The input transition at time $t_2$ also causes transmission pair 140 to be turned OFF and transmission pair 142 to be turned ON, thereby connecting common gate terminal 176 of logic pair 144 through feedback path 196 to the output of logic pair 146. Since the latter is in the ONE state, this maintains the output of logic pair 144 in the ZERO state. This, in turn, maintains the circuit output $F_1$ at ZERO, as shown in FIG. 3c.

Correspondingly, the low level at drain terminal 178 is connected to common gate 184 of logic pair 146. This maintains P-channel transistor 180 conductive with common drain 187 still connected to the power supply. This keeps circuit output state $\overline{F}_1$ at ONE, as shown in FIG. 3d.

During the next input transition at time $t_3$, F and $\overline{F}$ switch to ONE and ZERO, respectively, as shown in FIGS. 3a and 3b. This turns transmission pair 78 OFF and transmission pair 92 ON so that common gate terminal 112 of logic pair 106 is connected through feedback path 132 to output 134 of logic pair 124. The latter is already in the ON state, since common drain terminal 114 was low during time $t_3 - t_2$ due to the connection of gate terminal 112 through transmission pair 78 and feedback path 198 to drain terminal 186. Accordingly, there is no change in the output states of either logic pair 106 or 124.

The input transition at time $t_3$ also causes transmission pair 140 to be turned ON and transmission pair 142 to be turned OFF. This causes common gate terminal 176 of logic pair 144 to be connected to the output of logic pair 106. The low signal level at gate 176 causes logic pair 144 to switch stages since the output 178 of logic pair 144 was low during time $t_3 - t_2$ due to connection of gate 176 through ON transmission pair 142 and feedback path 198 to drain 186 of logic pair 146. As a result, circuit output $F_1$ switches from ZERO to ONE, as shown in FIG. 3c. Likewise, logic pair 206 switches state and circuit output $\overline{F}_1$ goes from ONE to ZERO, as shown in FIG. 3d.

During the next input transition at time $t_4$, F and $\overline{F}$ return to ZERO and ONE, respectively, as shown in FIGS. 3a and 3b. The circuit has returned to the initially described conditions and the sequence of operations described above is repeated. Comparing FIGS. 3a and 3c, and FIGS. 3b and 3d, it may be seen that outputs $F_1$ and $\overline{F}_1$ provide complementary signal transitions in response to transitions in the inputs F and $\overline{F}$ at a frequency exactly one-half the input frequency.

To achieve the desired degree of frequency division, it is merely necessary to combine a series of stages as described in FIG. 5 into a chain as shown in FIG. 4. Even a moderately large number of stages will be small enough for use in a wristwatch and will consume a realistically small amount of power.

Figure 6:
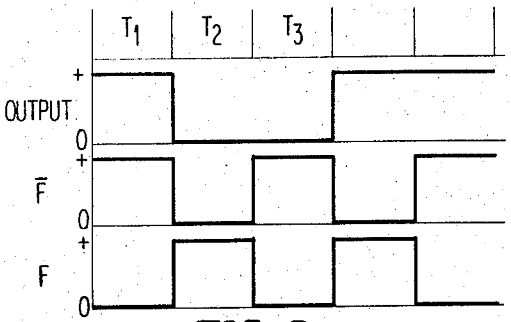
FIG. 6 is a timing and waveform diagram for the static counter stage illustrated in FIG. 5.

FIG. 6 is a waveform and timing diagram for the static counter stage illustrated in FIG. 5. Assuming that the counter input is at ONE during time $t_1$, the first flip-flop $P_1 - N_1$ and $P_4$–$N_4$ is open because transmission gate $P_7$–$N_7$ is open. The second flip-flop $P_2$–$N_2$ and $P_3$–$N_3$, however, is locked because transmission gate $P_6$–$N_6$ is closed. Information from the second flip-flop, therefore, is transferred through the ON transmission gate $P_8$–$N_8$ to the first flip-flop. A ZERO at point D in the circuit is transferred to point B, and a ONE awaits at point C. When F goes positive during the time $t_2$, the first flip-flop is locked and the second flip-flop is open and a ONE at point C is transferred to point A in the circuit, forcing the output $F_1$ of the stage to ZERO. As a result, each positive going clock pulse at F changes the state of the counter output once, thereby performing the function of binary coding. This is a static counter because during either time $t_1$ or $t_2$, one flip-flop is locked holding the information permanently, i.e., for as long as power is available.

The frequency of oscillation of the oscillator is somewhat arbitrary since the number of stages in the divider chain can be chosen to provide the proper low frequency output. However, the power consumption of the frequency divider is dependent upon the input frequency and the input capacitance according to the following equation:

$$P = kCV_2f + p$$

in which $P$ equals power, $k$ is a proportionality constant, $C$ equals input capacitance, $V$ equals supply voltage, $f$ equals input frequency, and $p$ equals leakage power.

In a watch, the parameters of operating voltage and oscillator frequency are normally determined by factors other than power consumption. Therefore, in order to conserve power in the divider chain, it is necessary to use divider stages with low leakage power and low input capacitance. The use of complementary MOS transistors solves the leakage problem while the use of as small a number of transistors as possible per stage minimizes the input capacitance. The number of transistors may be minimized by incorporating in the divider, and particularly in the high frequency stages, a number of dynamic counter stages. The dynamic counter stage actually utilizes the capacitance of the transistors to accomplish the divide by 2 function and will therefore only divide the higher frequencies. However, only a limited number of dynamic stages are necessary in a divider string since after the first several stages the power dissipated in the following stages is rather insignificant compared to the power in the preceding stages.

Figure 7:
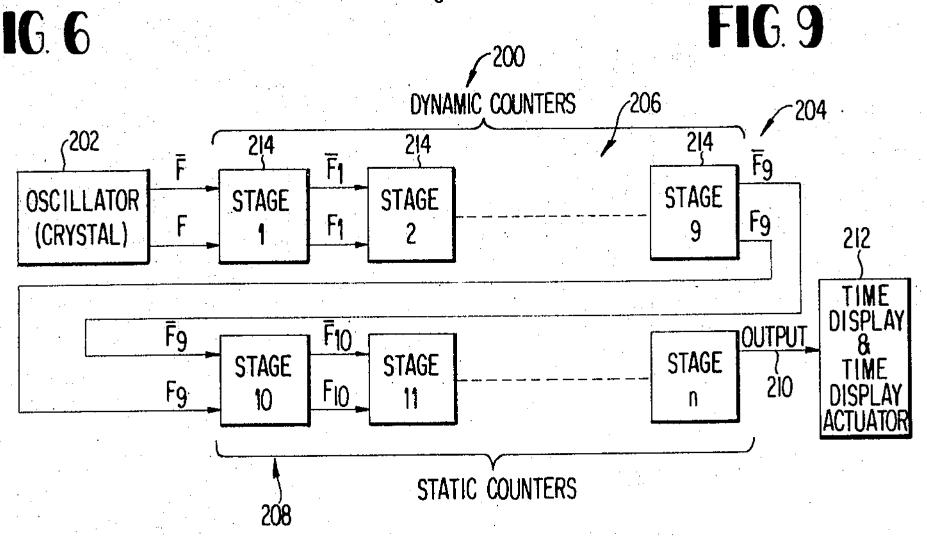
FIG. 7 is an overall block diagram of an electronically controlled watch constructed in accordance with the present invention and including a divider incorporating both dynamic and static counter stages.

FIG. 7 shows a modified wristwatch constructed in accordance with the present invention and generally indicated at 200. The watch comprises a crystal oscillator 202 forming the frequency standard source and corresponding to frequency standard 12 of FIG. 1. The output of oscillator 202 in FIG. 7 is supplied through a binary divider chain, generally indicated at 204, comprising nine dynamic counter stages illustrated at 206 and a plurality of static counter stages illustrated at 208. The output of the divider is supplied by lead 210 to a time display and time display actuator 212 which correspond to elements 16 and 18 of FIG. 1. Each of the static counter stages comprising stages 10, 11, . . . through stage n are preferably constructed in the manner illustrated in FIG. 5 and further description is believed unwarranted.

Figure 8:
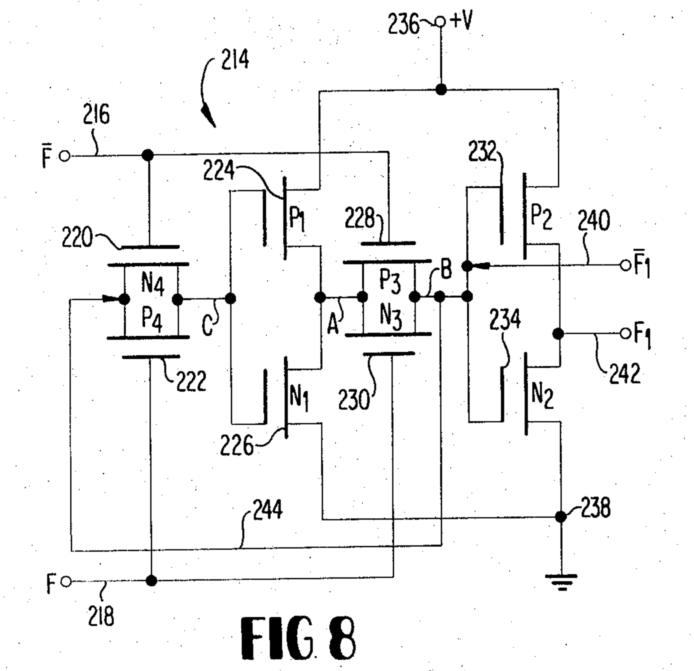
FIG. 8 is a circuit diagram of one of the dynamic counter stages forming a part of the counter illustrated in FIG. 7.

Each of the nine dynamic counter stages indicated at 214 in FIG. 7 is preferably constructed in the manner illustrated in FIG. 8. Referring to FIG. 8, the input signals F and $\overline{F}$ on leads 216 and 218 are applied to complementary MOS transistors 220 and 222. These transistors comprise an N-channel transistor labeled $N_4$ and a P-channel transistor labeled $P_4$ in FIG. 8. The output is applied to a second pair of complementary MOS transistors 224 and 226, labeled $P_1$ and $N_1$, respectively. Transistors 220 and 222 form a transmission gate and transistors 224 and 226 form a memory pair in the dynamic counter stage 214. Memory pair 224 and 226 are connected to a second transmission gate comprising complementary MOS transistor pair 228 and 230, labeled $P_3$ and $N_3$, and to a second memory pair comprising complementary MOS transistors 232 and 234, labeled $P_2$ and $N_2$. The F and $\overline{F}$ leads 216 and 218 are connected to the first transmission pair 220 and 222 and to the gates of the second transmission pair 228 and 230. A suitable power supply, such as the positive side of a watch battery, is connected to terminal 236 with the other side of the power supply connected to grounded terminal 238. The divider stage output signals, labeled $\overline{F}_1$ and $F_1$, appear on output leads 240 and 242. The gates of memory pair 232 and 234 are connected by lead 244 to provide a feedback path to transmission pair 220 and 222.

As can be seen, dynamic counter stage 214 in FIG. 8 is a dynamic counter stage made with eight transistors as compared with the static counter stage using sixteen transistors as shown in FIG. 5.

Figure 9:
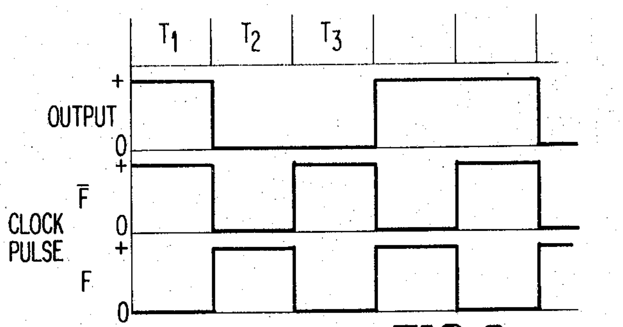
FIG. 9 is a waveform and timing diagram for the dynamic counter stage of FIG. 8.

FIG. 9 is a waveform and timing diagram for the dynamic counter stage 214 of FIG. 8. In operation, during time $t_1$, transmission gate $P_4$–$N_4$ in FIG. 8, is closed and gate $P_3$–$N_3$ is open. Assuming that the output is at ONE, points B and C in the circuit of FIG. 8 will be at ZERO and point A will be at ONE. As the clock changes at time $t_2$, transmission gate $P_4$–$N_4$ opens and gate $P_3$–$N_3$ closes. The ONE at point A therefore is transferred to point B, forcing the output to ZERO. As the clock pulse changes state, $P_4$–$N_4$ closes and $P_3$–$N_3$ opens, the ONE at B is transferred to C and a ZERO is waiting at point A until a positive going clock pulse at F opens gate $P_3$–$N_3$ which transfers the ZERO from A to B and changes the $F_1$ output back to ONE. Every positive going clock pulse at F therefore changes the state of the binary counter stage.

The dynamic counter 214 utilizes the high input resistance of the MOS transistor together with the concept of capacitive storage. Information is transferred from B to C during time $t_1$, and the capacitive load at B determines the maximum time $t_1$ that the information can be maintained. During clock time $t_2$, information is transferred from C to B through inverter $P_1$–$N_1$, therefore the duration of $t_2$ is determined by the capacitive load at C. It is desirable for the capacitance at B to be greater than that at C to insure reliable operation. In the binary frequency divider, however, B drives the inverted clock signal of the following stage, thus adding to the capacitance at B.

Figure 10:
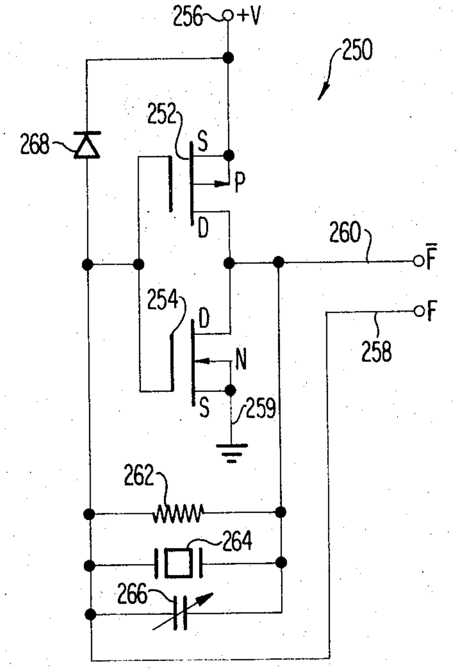
FIG. 10 is a circuit diagram of a preferred oscillator construction usable as the frequency standard of FIG. 1 or the oscillator source of FIG. 7.

FIG. 10 shows a modified oscillator construction in accordance with the present invention. The oscillator, generally indicated at 250 in FIG. 10, is a crystal controlled oscillator and may form the frequency standard 12 of FIG. 1 or the oscillator 202 of FIG. 7. It comprises a complementary pair of integrated circuit enhancement transistors comprising P-channel transistor 252 and N-channel transistor 254 connected between positive supply terminal 256 and the other or grounded side of the power supply as indicated at 258. The F and $\overline{F}$ outputs for the divider, such as divider 14 of FIG. 1, or divider 204 of FIG. 7, are developed on output leads 258 and 260 in FIG. 10. Transistors 252 and 254 form an MOS integrated circuit inverter and have connected across them a bias resistor 262, a quartz crystal 264, and a variable tuning capacitor 266. Connected between the positive power supply terminal 256 and the transistor gates is a protective diode 268.

The active element of the oscillator 250 of FIG. 10 is the complementary MOS inverter with the protective diode 268 between the gate and source of the P-channel transistor 252. This inverter can be either a separate device or a part of the integrated circuit divider chain. The bias resistor 262 is used to bias the inverter into the linear region by making the input voltage equal to the output voltage under static conditions. Once the oscillator is under the control of the crystal, the bias resistor 262 is no longer a significant part of the circuit. A typical value for the bias resistor is about 22 megaohms. Quartz crystal 264 is of the type normally used in oscillators where the Q is high and the series resistance is low. The shunt capacitance of the crystal should be less than 10 picofarads. Tuning capacitor 266 is used to adjust the oscillator over a narrow range of frequencies. The value of this capacitor is normally between 0.5 and 5.0 picofarads. Oscillator 250 provides the two-phase output required by the first stage of the divider chain. If another oscillator were used with a single phase output, it would be necessary to add an inverter either as part of the oscillator or part of the divider chain to shift the phase 180° and provide the two-phase input required by the divider.

The gate protective diode 268 is desirable because in MOS transistors it is easy to permanently damage a transistor by applying a voltage to the gate which is higher than the source or substrate voltage. A high potential on the gate will cause arcing across the gate dielectric which will create pinholes in the dielectric and alter the transistor characteristics. By adding the diode 268 between the gate and source of transistor 252, a current path is provided when the gate voltage is higher than the source of potential.

In the foregoing there has been described an electronically regulated timekeeping device characterized by sufficiently small size and low power dissipation to be practical for use in a device of wristwatch size. While the preferred embodiment and certain especially significant operating conditions have been set forth in detail, it should be understood that various modifications will be apparent to those skilled in the art in light of the foregoing description. These include, for example, substitution of other circuit designs for the frequency standard oscillator described in FIGS. 2 and 10, as well as substitution of alternative time display means for the watch face and hands illustrated. One such modification contemplated is an optical display providing an illuminated time indication. In this case, display actuating means 18 is a simple integrated circuit switching means providing selective actuation of the display elements in response to the drive signal output of frequency converter 14. A variation of transistor types for the latter circuit, consistent with the requirements set forth herein, are also possible.

The display has been described in only general terms, it being understood that it can assume any one of several forms. The most conventional form for accumulating the output of the last stage of the divider and further subdividing it for eventual display of time is to use this low frequency (0.5 to 64 Hz approximately) output to control the speed of a motor (transducer) which drives a conventional watch-type gear train with hands attached to the shafts of appropriate gears. The motor can take several forms, such as reciprocating, continuous rotation, or stepper switch, and the like. An example of one form a mechanical actuator and display may take is that shown and described in my copending application Ser. No. 726,090, filed May 2, 1968, the disclosure of which is incorporated herein by reference.

Another form which the display can take is to replace the gear train (mechanical computer) with electronic circuits to perform the same function of subdividing and storing the low frequency output of a last stage of the divider. This stored information is then decoded in such a way as to selectively activate light-emitting or light-reflecting areas which create a digital display of the time stored in the electronic circuits. In order to conserve power, these electronic circuits can also be made using complementary MOS transistors with or without protective diodes in the inputs. In the case of a completely solid state watch, the numeral can be formed using such well-known devices as miniature incandescent bulbs, light-emitting diodes or liquid crystals, as well as lesser known devices, such as ferro-electric crystals or electro-luminescent displays and others. An example of one form an electro-optical actuator and display may take is that shown and described in my copending application Ser. No. 818,228, filed Apr. 22, 1969, the disclosure of which is incorporated herein by reference.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A timekeeping device of sufficiently small size and power consumption for use as a wristwatch comprising a source of electrical signals having a frequency of at least about 5 kilohertz, a frequency divider coupled to said electrical signal source for reducing the frequency of said electrical signals, a time display, and a display actuator coupling said divider to said time display, said divider comprising a plurality of stages of transistor integrated circuitry, each stage comprising at least one pair of complementary MOS transistors including a P-channel MOS transistor and an N-channel MOS transistor.

2. A timekeeping device as defined in claim 1 wherein said electrical source also includes at least one pair of complementary MOS transistors.

3. A timekeeping device as defined in claim 2 wherein said electrical source comprises a crystal controlled oscillator utilizing only a single pair of complementary transistors.

4. A timekeeping device as defined in claim 3 wherein said oscillator is provided with a tuning capacitor for tuning the output frequency of said oscillator over a limited range.

5. A timekeeping device as defined in claim 1 wherein said divider comprises a plurality of high frequency stages and a plurality of low frequency stages of different construction, each of said high and low frequency stages comprising at least one pair of complementary MOS transistors.

6. A timekeeping device as defined in claim 5 wherein said high frequency stages are dynamic stages, and said low frequency stages are static stages.

7. A timekeeping device as defined in claim 6 wherein said high frequency stages comprise a dynamic counter and said low frequency stages comprise a static counter.

8. A timekeeping device as defined in claim 5 wherein said high frequency stages have fewer transistors per stage than said low frequency stages.

9. A timekeeping device as defined in claim 8 wherein said high frequency stages have no more than half as many transistors as said low frequency stages.

10. A timekeeping device of sufficiently small size and power consumption for use as a wristwatch comprising an oscillator including at least one pair of complementary MOS transistors, a time display, a display actuator for actuating said time display in response to signals from said oscillator, and frequency conversion means coupling said oscillator to said actuator for substantially reducing the frequency of the oscillator signals, said frequency conversion means comprising a plurality of stages of transistor integrated circuitry, each stage including a plurality of logic means and a plurality of signal transmission means coupling said logic means together, said logic means and said signal transmission means having control inputs and signal paths, with the conductivity states of said signal paths being switchable in response to changes in the signal at said control inputs, substantial current flow in said signal paths occurring only during transition between conductivity states, the logic means and signal transmission means in each of said stages of transistor integrated circuitry being comprised of first transistors of a predetermined conductivity type, and second transistors of opposite conductivity type, coupled together with transistors from one conductivity type serving in a load circuit for transistors of the opposite conductivity type.

11. A timekeeping device as defined in claim 10 wherein said actuator comprises an electromechanical transducer for converting electrical signals into mechanical motion.

12. A timekeeping device as defined in claim 11 wherein said time display comprises indicating hands rotatable over a timepiece face.

13. A timekeeping device as defined in claim 10 wherein said time display comprises a plurality of electro-optical devices.

14. A timekeeping device as defined in claim 13 wherein said electro-optical devices are physically arranged to form digital numbers to the base 10.

15. A timekeeping device as defined in claim 14 wherein said electro-optical devices are light-emitting diodes.

16. A frequency divider having sufficiently small size and power consumption for use in a wristwatch comprising a plurality of stages of transistor integrated circuitry forming a binary divider chain, each stage comprising at least one pair of complementary MOS transistors including a P-channel MOS transistor and an N-channel MOS transistor, with the conductivity states of said MOS transistors being switchable in response to changes in the signal at the input of the stage whereby substantial current flow through said transistors occurs only during transition between conductivity states, some of said stages being high frequency stages and some of said stages being low frequency stages of different construction, said high frequency stages having a lower input capacitance than said low frequency stages.

17. An oscillator having sufficiently small size and power consumption for use in a wristwatch comprising as the active elements of the oscillator at least one pair of complementary MOS transistors, and frequency controlling means coupled to said transistors for controlling the frequency of said oscillator, said transistors comprising a P-channel MOS transistor and an N-channel MOS transistor connected to form an inverter.

18. An oscillator having sufficiently small size and power consumption for use in a wristwatch comprising as the active elements of the oscillator at least one pair of complementary MOS transistors, and frequency controlling means coupled to said transistors for controlling the frequency of said oscillator, said oscillator including only a single pair of complementary MOS transistors, and a bias resistor, a quartz crystal, and a tuning capacitor all coupled in parallel between the gates and drains of said transistors.

19. An oscillator having sufficiently small size and power consumption for use in a wristwatch comprising as the active elements of the oscillator at least one pair of complementary MOS transistors, and frequency controlling means coupled to said transistors for controlling the frequency of said oscillator, and including means for deriving a first output signal coupled to the drains of said transistor pair and means for deriving a second output signal coupled to the gates of said transistor pair.

20. A frequency divider having sufficiently small size and power consumption for use in a wristwatch and adapted to receive an input signal from an electrical source having a frequency of at least about 5 KHz, said divider being adapted to reduce the frequency of said input signals to produce an electrical output for driving a time display through a display actuator, said divider comprising a plurality of stages of transistor integrated circuitry forming a binary divider chain, each stage comprising at least one pair of complementary MOS transistors including a P-channel MOS transistor and an N-channel MOS transistor, with the conductivity states of said MOS transistors being switchable in response to changes in the signal at the input of the stage whereby substantial current flow through said transistors occurs only during transition between conductivity states.

21. In a wristwatch wherein the output of a frequency divider drives a time display through a display actuator, a timing source comprising an oscillator having sufficiently small size and power consumption for use in a wristwatch and including as active elements of the oscillator only a single pair of complementary MOS transistors connected to form an inverter, and frequency controlling means coupled to said transistors for controlling the frequency of said oscillator.

22. A frequency divider as defined in claim 16 wherein said high frequency stages are dynamic counter stages and said low frequency stages are static counter stages, said dynamic counter stages having fewer transistors than said static counter stages.

23. A divider as defined in claim 22 including at least nine dynamic counter stages.

24. An oscillator as defined in claim 17 including a protective diode coupled between the gate and source of said P-channel MOS transistor.

25. An oscillator as defined in claim 24 wherein said oscillator includes only a single pair of complementary MOS transistors.

* * * * *

UNITED STATES PATENT OFFICE
CERTIFICATE OF CORRECTION

Patent No. 3,664,118 Dated May 23, 1972

Inventor(s) Richard S. Walton

It is certified that error appears in the above-identified patent and that said Letters Patent are hereby corrected as shown below:

In Column 1, lines 5, 6 and 7, "This application is a continuation-in-part of copending application Ser. No. 768,076, filed Oct. 16, 1968, now U.S. Pat. No. 3,560,998." should be canceled.

In Column 9, line 48, the equation "$P = kCV_2f + p$" should read --$P = kCV^2f + p$--.

Signed and sealed this 3rd day of April 1973.

(SEAL)
Attest:

EDWARD M. FLETCHER, JR.
Attesting Officer

ROBERT GOTTSCHALK
Commissioner of Patents

USCOMM-DC 60376-P69

Disclaimer 3,664,118.—*Richard S. Walton*, Lancaster, Pa. ELECTRONICALLY CONTROLLED TIMEPIECE USING LOW POWER MOS TRANSISTOR CIRCUITRY. Patent dated May 23, 1972. Disclaimer filed Oct. 16, 1973, by the assignee, *Hamilton Watch Company*.

Hereby enters this disclaimer to claim 20 of said patent.

[*Official Gazette June 10, 1975.*]